(12) United States Patent
Liu et al.

(10) Patent No.: US 8,357,899 B2
(45) Date of Patent: Jan. 22, 2013

(54) COLOR CORRECTION CIRCUITRY AND METHODS FOR DUAL-BAND IMAGING SYSTEMS

(75) Inventors: Changmeng Liu, San Jose, CA (US); Yingjun Bai, San Jose, CA (US); Qun Sun, San Jose, CA (US)

(73) Assignee: Aptina Imaging Corporation, George Town (KY)

( * ) Notice: Subject to any disclaimer, the term of this patent is extended or adjusted under 35 U.S.C. 154(b) by 147 days.

(21) Appl. No.: 12/848,086

(22) Filed: Jul. 30, 2010

(65) Prior Publication Data

US 2012/0025080 A1 Feb. 2, 2012

(51) Int. Cl.
*H01L 25/00* (2006.01)
(52) U.S. Cl. .................. 250/332; 250/338.1
(58) Field of Classification Search .......... 250/332
See application file for complete search history.

(56) References Cited

U.S. PATENT DOCUMENTS

| | | | |
|---|---|---|---|
| 5,732,293 A | 3/1998 | Nonaka et al. | |
| 6,590,679 B1 * | 7/2003 | Edgar et al. | 358/514 |
| 7,239,344 B1 | 7/2007 | Ikoma et al. | |
| 7,453,064 B2 | 11/2008 | Lee | |
| 2003/0093805 A1 | 5/2003 | Gin | |
| 2006/0177129 A1 * | 8/2006 | Matsuyama | 382/167 |
| 2007/0145273 A1 * | 6/2007 | Chang | 250/338.1 |
| 2008/0029714 A1 | 2/2008 | Olsen et al. | |
| 2008/0079828 A1 * | 4/2008 | Izawa | 348/294 |
| 2008/0218597 A1 * | 9/2008 | Cho | 348/222.1 |
| 2010/0102206 A1 * | 4/2010 | Cazaux et al. | 250/208.1 |
| 2011/0317048 A1 * | 12/2011 | Bai et al. | 348/294 |

* cited by examiner

*Primary Examiner* — Marcus Taningco
(74) *Attorney, Agent, or Firm* — Treyz Law Group; David C. Kellogg; G. Victor Treyz

(57) ABSTRACT

An imaging system may include a dual-band image sensor that captures visible and near-infrared light and image processing circuitry that performs color corrections on images captured by the dual-band image sensor. The image processing circuitry may analyze each captured image in two different color spaces to determine what type of light source lit each image. The image processing circuitry may determine whether an image was lit by a light source having a relatively high proportion of near-infrared emissions such as an incandescent light, a light source having a relatively low proportion of near-infrared emissions such as a fluorescent light, or a light source having an intermediate proportion of near-infrared emissions such as sunlight or other blackbody radiator. After determining what type of light source lit an image, the image processing circuitry may adjust color balances in that image using a color correction matrix associated with that type of light source.

4 Claims, 8 Drawing Sheets

COLOR CORRECTION CIRCUITRY AND METHODS FOR DUAL-BAND IMAGING SYSTEMS

BACKGROUND

This relates to imaging systems and, more particularly, to color correction in dual-band imaging systems.

Modern electronic devices such as cellular telephones, cameras, and computers often use digital image sensors. Imagers (i.e., image sensors) may be formed from a two-dimensional array of image sensing pixels. Each pixel receives incident photons (light) and converts the photons into electrical signals.

Typical imagers include red, green, and blue image sensing pixels and color correction circuitry. Red pixels may be configured to capture incident light in the red portion of the visible spectrum, blue pixels may be configured to capture incident light in the blue portion of the visible spectrum, and green pixels may be configured to capture incident light in the green portion of the visible spectrum. The color correction circuitry is used to correct the color balance of images captured by the imager using information on the relative intensities of incident light received by the red, green, and blue pixels.

Dual-band imagers used dual-band IR cut filter, which simultaneously pass photons in the visible spectrum and the near infrared (NIR) spectrum. At day time, both visible spectrum and near-infrared spectrum photons pass through dual-band IR filter. At night time, an additional near-infrared light source, which only emits NIR spectrum, is used to illuminant the scene, and the dual-band NIR image sensor perceives the NIR light signal. As an alternative, a mechanical switch could be used in a NIR imager to turn the IR-cut filter on and off as an alternative to a static dual band filter between day mode and night mode.

Dual-band IR imager has advantage of low cost and low maintenance compare to the mechanical IR filters switch approach. However, with dual-band IR imagers it is difficult to perform color reproduction for day mode because the visible light and NIR light are mixed, which violates the conventional principles of color reproduction. It would therefore be desirable to provide color correction circuitry and methods for dual-band imaging systems to handle the color reproduction difficulty.

DETAILED DESCRIPTION

Figure 1:
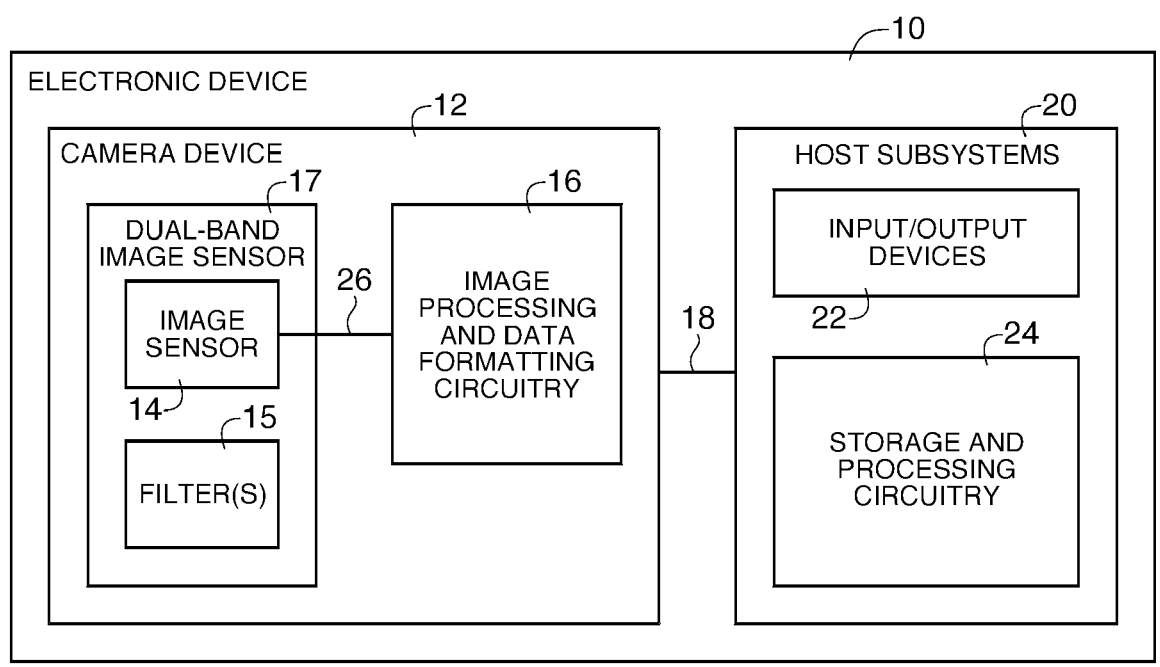
FIG. 1 is a diagram of an illustrative electronic device that may include a camera module with a dual-band camera sensor that is sensitive to visible and near-infrared light, that may include a dual-band IR filter, and that may include image processing and data formatting circuitry that produces color corrected images using image data from the dual-band camera sensor in accordance with an embodiment of the present invention.

An electronic device with a digital camera module is shown in FIG. 1. Electronic device 10 may be a digital camera, a computer, a cellular telephone, a medical device, or other electronic device. Camera module 12 may include image sensor 14 and one or more lenses. During operation, the lenses focus light onto image sensor 14. Image sensor 14 includes photosensitive elements (i.e., pixels) that convert the light into digital data. Image sensors may have any number of pixels (e.g., hundreds, thousands, millions, or more). A typical image sensor may, for example, have millions of pixels (e.g., megapixels).

Camera module 12 may include light filters 15 that block wavelengths of light from impinging upon the photosensitive elements in image sensor 14. A dual-band IR camera sensor 17 may be the combination of image sensor 14 and light filter 15. Light filters 15 may be formed as a film on or integrated into one or more lenses that focus light onto image sensor 14. Light filters 15 may be formed on or integrated into individual photosensitive elements (e.g., sensor 14 may include micro-filters 15 on each photosensitive element or on groups of photosensitive elements). If desired, light filters 15 may be formed over an array of photosensitive elements in image sensor 14.

Still and video image data from dual-band IR camera sensor 17 may be provided to image processing and data formatting circuitry 16 via path 26. Image processing and data formatting circuitry 16 may be used to perform image processing functions such as data formatting, adjusting white balance and exposure, implementing video image stabilization, face detection, etc. Image processing and data formatting circuitry 16 may also be used to compress raw camera image files if desired (e.g., to Joint Photographic Experts Group or JPEG format). In a typical arrangement, which is sometimes referred to as a system on chip or SOC arrangement, dual-band IR camera sensor 17 and image processing and data formatting circuitry 16 are implemented on a common integrated circuit. The use of a single integrated circuit to implement dual-band IR camera sensor 17 and image processing and data formatting circuitry 16 can help to minimize costs.

Camera module 12 (e.g., image processing and data formatting circuitry 16) conveys acquired image data to host subsystem 20 over path 18. Electronic device 10 typically provides a user with numerous high-level functions. In a computer or advanced cellular telephone, for example, a user may be provided with the ability to run user applications. To implement these functions, host subsystem 20 of electronic device 10 may have input-output devices 22 such as keypads, input-output ports, joysticks, and displays and storage and processing circuitry 24. Storage and processing circuitry 24 may include volatile and nonvolatile memory (e.g., random-access memory, flash memory, hard drives, solid state drives, etc.). Storage and processing circuitry 24 may also include microprocessors, microcontrollers, digital signal processors, application specific integrated circuits, etc.

Filter 15 may include, as examples, a visible light pass filter that passes light in the visible spectrum (e.g., light that is detectable by a human eye) while blocking other wavelengths of light, a near-infrared light filter that passes light in the near-infrared spectrum (e.g., light with wavelengths that are longer than those of visible light) while blocking other wavelengths of light, a dual-band IR filter that passes light in both visible spectrum and near-infrared spectrum while blocking other wavelengths of light, other types of light filters, and combinations of these and other light filters. As one example, filter 15 may be a dual-band IR filter that passes a first band of wavelengths in the visible spectrum (e.g., light having wavelengths between approximately 400 nanometers and approximately 700 nanometers) and that passes a second band of wavelengths in a near-infrared region.

Camera module 12 may operate in a color imaging mode in which color images are captured and a black-and-white imaging mode, which may also be referred to herein as a night mode or a night vision mode, in which black-and-white images are captured. In both modes, dual-band IR camera sensor 17 may be exposed to both visible wavelengths and near-infrared wavelengths such as near-infrared (NIR) wavelengths. Device 10 may provide an opportunity for a user to provide user input controlling whether camera module 12 operates in the black-and-white imaging mode or in the color imaging mode. Camera module 12 may analyze signals from light-sensitive pixel to determine ambient light levels. When ambient light levels are above a given threshold, camera module 12 may automatically switch to the color imaging mode and, when ambient light levels are below the given threshold, camera module 12 may automatically switch to the black-and-white imaging mode.

Figure 2:
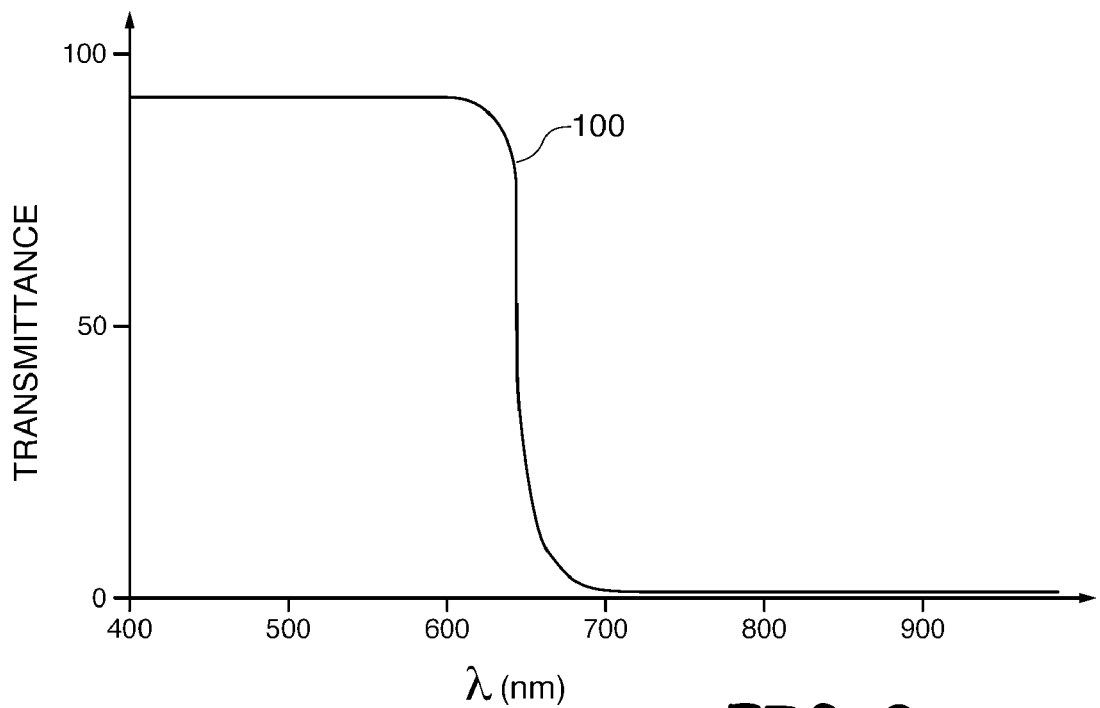
FIG. 2 is a graph of the relative transmittance as a function of the wavelength of incident light of a conventional IR cut filter.

A graph of the transmittance of conventional visible light filters is shown in FIG. 2. Graph 100 represents the transmittance of conventional visible light filters as a function of the wavelength of incident light. As shown in FIG. 2, conventional visible light filters transmit most incident light in the visible spectrum (e.g., conventional visible light filters have a transmittance of approximately 100% for light with wavelengths between 400 nanometers and 700 nanometers). At longer wavelengths such as near-infrared frequencies, the transmittance of conventional visible light filters drops to approximately zero.

Figure 3:
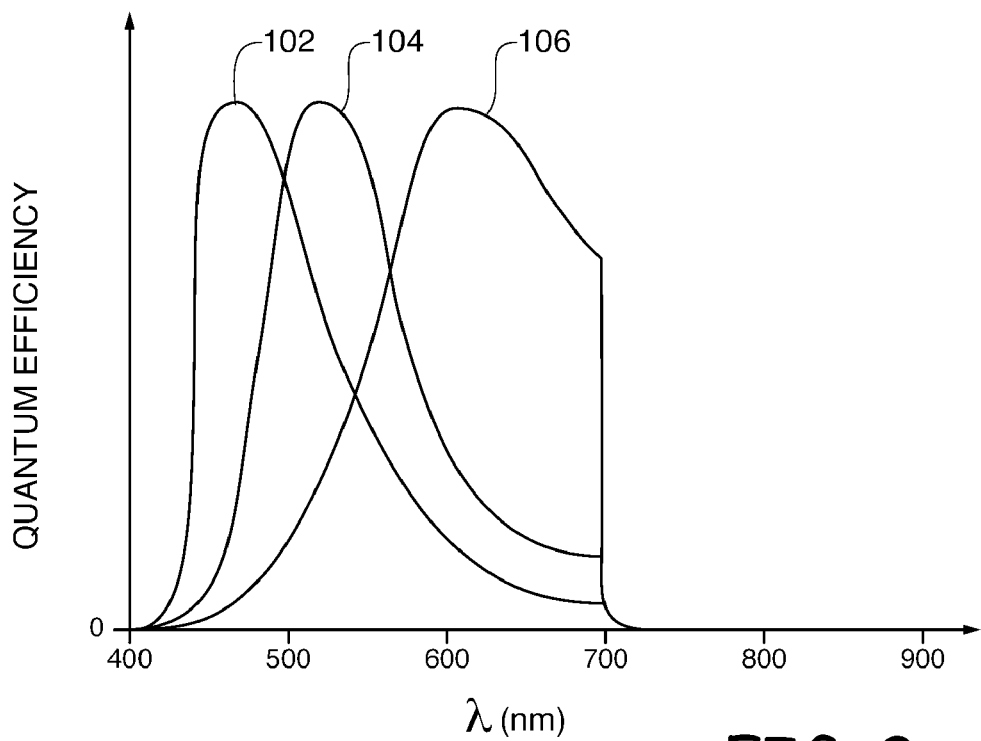
FIG. 3 is a graph of the quantum efficiency of a conventional image sensor including blue pixels, green pixels, and red pixels with an IR cut filter of the type described in FIG. 2.

A graph of the sensor response (i.e., quantum efficiency) in an imager that includes a conventional IR-cut filter of the type described in FIG. 2 is shown in FIG. 3. Graph 102 represents the sensor response of blue pixels (i.e., pixels that are most sensitive to blue light), graph 104 represents the sensor response of green pixels (i.e., pixels that are most sensitive to green light), and graph 106 represents the sensor response of red pixels (i.e., pixels that are most sensitive to red light).

Conventional auto white balancing and color correction circuitry is often used to estimate the color temperature of a light source. Typically, color correction circuitry will compare the weighted average of one channel against another channel (e.g., the color correction circuitry will compare red channel intensity to blue channel intensity). The color correction circuitry then uses information on the relative intensities of different colors of light in the image to generate a result for a color prediction function. The result of the color prediction function is used by the color correction circuitry in estimating the color temperature of a light source that lit an image and the color correction matrix. Once the color temperature of the light source has been estimated, the color correction circuitry is able to perform color correction operations.

Figure 4:
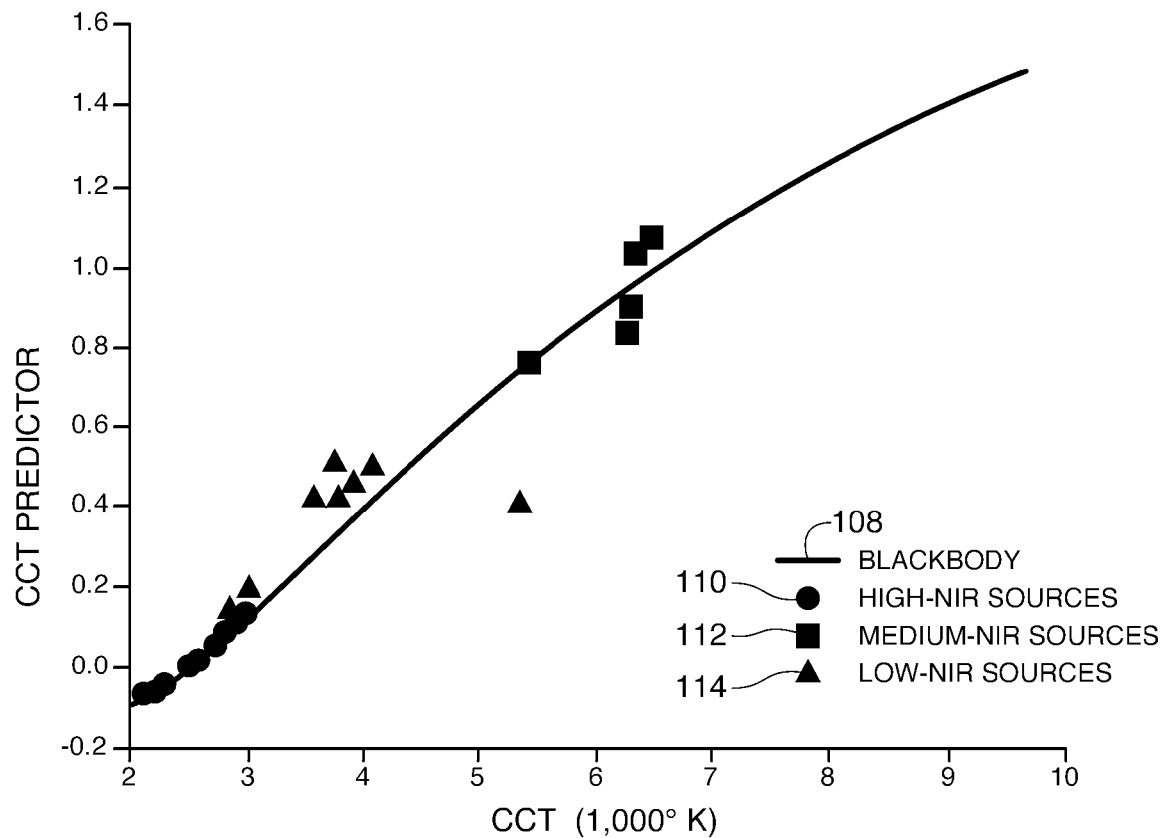
FIG. 4 is a graph of correlated color temperature predictions for light sources that have varying levels of near-infrared light based on images captured with a conventional visible light imager.

As shown in the graph of FIG. 4, conventional color correction circuitry, when implemented in a visible light imager produces color temperature predictor results that can be used with relative accuracy to estimate the color temperature of light sources of various types. Because each value of the color prediction function used by conventional color correction circuitry in a visible light imager corresponds to only a single color temperature, the value of the color prediction function is sufficient to determine the color temperature of light sources of images captured by the visible light imager.

Graph 108 represents the result of a color prediction function used by conventional color correction circuitry for an idealized blackbody radiator as a function of the actual color temperature of the blackbody radiator.

Points 110 represent examples of light sources with a relatively high amount of near-infrared (NIR) light such as incandescent lights and are sometimes referred to herein as high near-infrared or high-NIR light sources. Each point 110 represents the result of the color prediction function for a particular high-NIR light source and the actual color temperature of that high-NIR light source. High-NIR light sources may be defined as light sources that produce light via incandescence (e.g., blackbody radiation) and have a blackbody radiating temperature that is below that of the Sun (i.e., approximately 5770° Kelvin).

Points 114 represent examples of light sources with a relatively low amount of near-infrared (NIR) light such as fluorescent lights and are sometimes referred to herein as low near-infrared or low-NIR light sources. Each point 114 represents the result of the color prediction function for a particular low-NIR light source and the actual color temperature of that low-NIR light source. Low-NIR light sources may be defined as light sources that produce light by means other than incandescent such as fluorescence, electroluminescence (e.g., light-emitting diodes), and gas discharge (e.g., neon lamps).

Points 112 represent examples of light sources with a proportion of near-infrared (NIR) between that of low-NIR and high-NIR light sources. Points 112 may represent light sources such as daylight from the sun and which are sometimes referred to herein as medium near-infrared or medium-NIR light sources. Each point 112 represents the result of the color prediction function for a particular medium-NIR light source and the actual color temperature of that medium-NIR light source.

Figure 5:
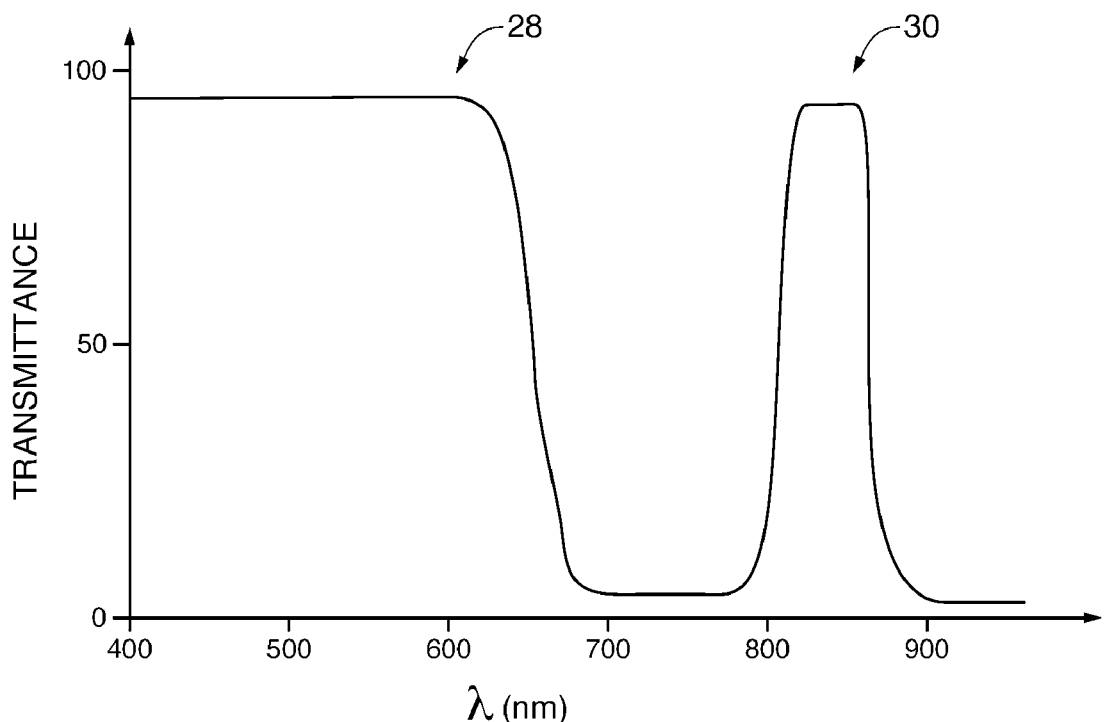
FIG. 5 is a graph of the relative transmittance as a function of the wavelength of incident light of an illustrative dual-band IR filter that passes visible light and near-infrared light to an imager in accordance with an embodiment of the present invention.

As described in connection with FIG. 1, camera module 12 may include a filter such as dual-band filter 15 that allows visible light and near-infrared light (e.g., near-infrared NIR light) to pass to photosensitive elements in dual-band IR camera sensor 17. A graph of the transmittance as a function of the wavelength of incident light of a dual-band IR filter such as dual-band filter 15 is shown in FIG. 5. As shown in FIG. 5, dual-band filter 15 may pass visible light in band 28 and may pass near-infrared light in band 30.

Band 28 may include a band of transmittance covering the spectrum of visible light from approximately 400 nanometers to approximately 700 nanometers. If desired, band 28 may only transmit one or more portions of the visible light spectrum without transmitting the entire spectrum. As an example, specific wavelengths or bands of wavelengths in the visible light spectrum may be blocked by filter 15.

Band 30 may include a band of transmittance covering a near-infrared region from approximately 800 nanometers to approximately 900 nanometers. If desired, band 30 may connect to band 28 (e.g., filter 15 may include a single band of transmittance covering blue light at approximately 400 nanometers to near-infrared light such as light at approximately 900 nanometers). In the example of FIG. 5, band 30 covers near-infrared regions that are associated with near-infrared light reflected off an object from a light source. If desired, band 30 may cover mid or far near-infrared regions (e.g., band 30 may pass near-infrared light that is associated with direct emissions from a radiator that is not otherwise glowing such as a radiator at a temperature below 400° Celsius).

If desired, band 30 may cover other wavelengths. As examples, the lower end of band 30 may approximately start at wavelengths such as 700 nanometers (nm), 725 nm, 750 nm, 775 nm, 800 nm, 825 nm, 850 nm, 875 nm, 900 nm, 925 nm, 950 nm, 975 nm, 1000 nm, 1025 nm, 1050 nm, 1075 nm, and 1100 nm. The upper end of band 30 may approximately start at wavelengths such as 800 nm, 825 nm, 850 nm, 875 nm, 900 nm, 925 nm, 950 nm, 975 nm, 1000 nm, 1025 nm, 1050 nm, 1075 nm, 1100 nm, 1125 nm, 1150 nm, 1175 nm, and 1200 nm.

Figure 6:
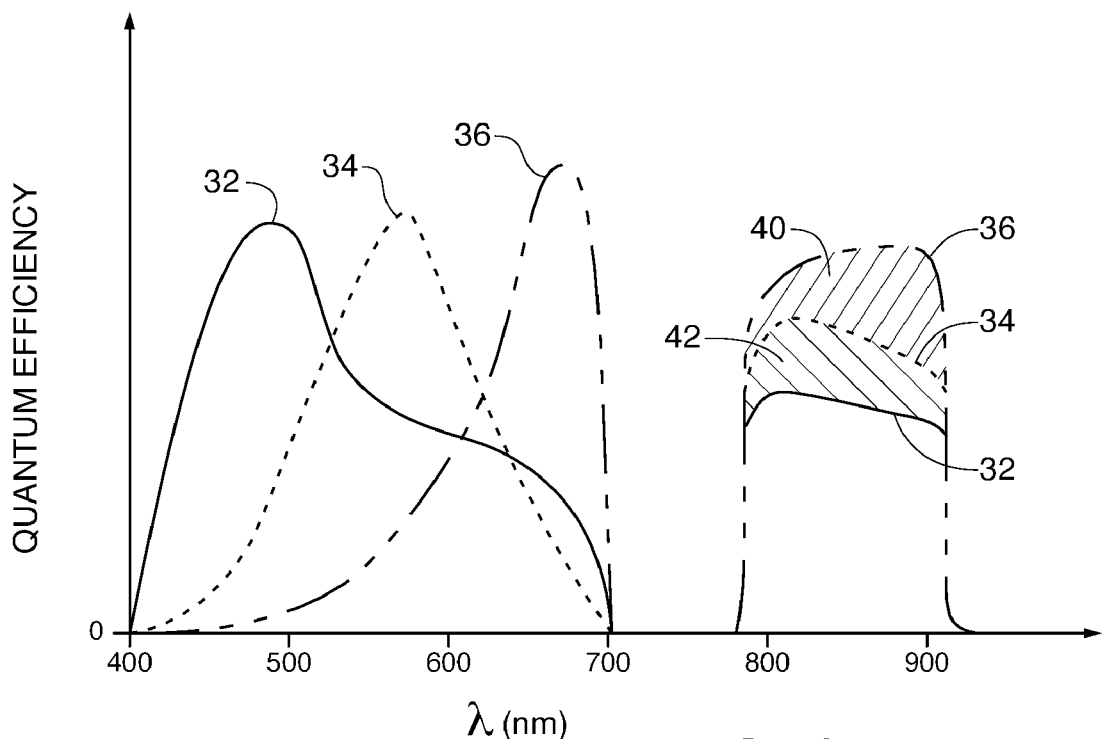
FIG. 6 is a graph of the quantum efficiency of illustrative dual-band image sensor consisting of blue pixels, green pixels, and red pixels in a dual-band imager with a dual-band IR filter of the type described in connection with FIG. 5 in accordance with an embodiment of the present invention.

A graph of the quantum efficiency of light-sensitive pixels such as pixels in dual-band IR camera sensor 17 of FIG. 1 is shown in FIG. 6. In the example of FIG. 6, camera module 12 includes a dual-band IR filter (e.g., a filter of the type described in connection with FIG. 5) that passes visible light and near-infrared light to the pixels of dual-band IR camera sensor 17. Graph 32 is an illustrative example of the quantum efficiency of blue pixels (i.e., pixels that are most sensitive to blue light), graph 34 is an illustrative example of the quantum efficiency of green pixels (i.e., pixels that are most sensitive to green light), and graph 36 is an illustrative example of the quantum efficiency of red pixels (i.e., pixels that are most sensitive to red light). The examples of graphs 32, 34, and 36 are merely illustrative and, in general, the quantum efficiencies of light sensitive pixels in dual-band IR camera sensor 17 may be different than the quantum efficiencies shown in FIG. 6.

As illustrated in FIG. 6 by striped region 40 and striped region 42, each of the various types of pixels (i.e., blue, red, and green pixels) in dual-band IR camera sensor 17 may have a different quantum efficiency (i.e., efficiency at converting incident light into electrical signals) in the near-infrared region of band 30 of FIG. 5. Because the blue, red, and green pixels generate electrical signals in response to the sum total of incident light, the differences in the NIR quantum efficiencies of the different colors of pixels alter the relative relationships between the different colors of pixels depending on what type of light source is illuminating an image being captured by dual-band IR camera sensor 17. These properties complicate color correction and conventional color correction techniques of the type described in connection with FIG. 4 would not function with a dual-band imager such as dual-band IR camera sensor 17.

Figure 7:
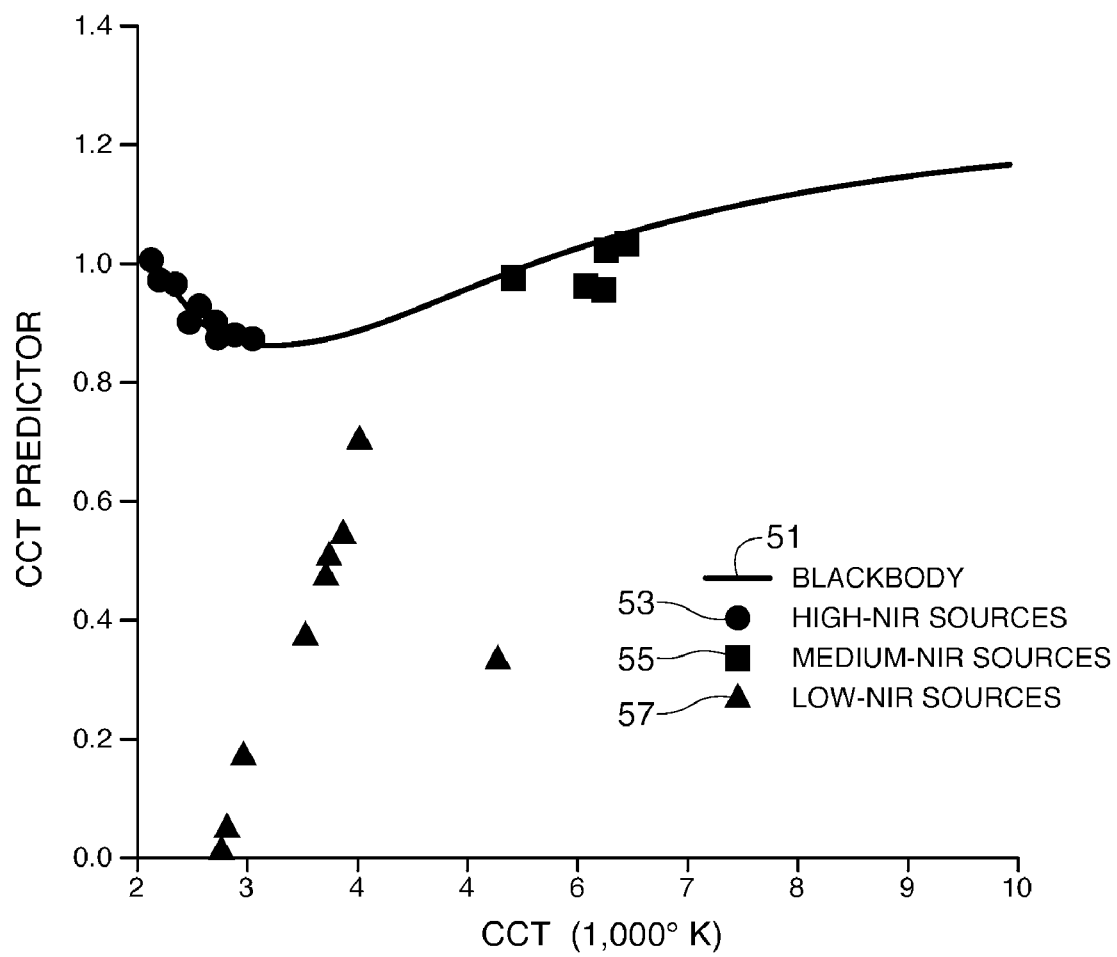
FIG. 7 is a graph of correlated color temperature predictions for light sources that have varying levels of near-infrared light when images are captured with a dual-band imager.

A graph illustrating the problems that would arise if conventional color correction techniques were used with a dual-band imager such as dual-band IR camera sensor 17 is shown in FIG. 7. As shown in FIG. 7, if conventional color prediction functions, such as the color prediction function described in connection with FIG. 4 in which the weighted average of the first color is compared against the weighted average of the second color, were used on image data captured by dual-band imagers such as dual-band IR camera sensor 17, the results of the color prediction function could not be used to estimate the color temperature of the image accuracy.

Graph 51 represents the result of applying a conventional color prediction function of the type described in connection with FIG. 4 to images lit by an idealized blackbody radiator as a function of the actual color temperature of the blackbody radiator.

Points 53 represent examples of light sources with a relatively high amount of near-infrared (NIR) light such as incandescent lights and are sometimes referred to herein as high near-infrared or high-NIR light sources. Each point 53 represents the result of applying the conventional color prediction function to an image captured by dual-band IR camera sensor 17 and lit by a particular high-NIR light source and each point 53 represents the actual color temperature of that high-NIR light source.

Points 57 represent examples of light sources with a relatively low amount of near-infrared (NIR) light such as fluorescent lights and are sometimes referred to herein as low near-infrared or low-NIR light sources. Each point 57 represents the result of applying the conventional color prediction function to an image captured by dual-band IR camera sensor 17 and lit by a particular low-NIR light source and each point 57 represents the actual color temperature of that low-NIR light source.

Points 55 represent examples of light sources with a proportion of near-infrared (NIR) between that of low-NIR and high-NIR light sources. Points 55 may represent light sources such as daylight from the sun and which are sometimes referred to herein as medium near-infrared or medium-NIR light sources). Each point 55 represents the result of applying the conventional color prediction function to an image captured by dual-band IR camera sensor 17 and lit by a particular medium-NIR light source and each point 55 represents the actual color temperature of that medium-NIR light source.

If used on images data from dual-band IR camera sensor 17, conventional color prediction functions would produce values that are not uniquely associated with a single color temperature as in the graph of FIG. 4. For example, the values of the color temperature predictor are approximately one for high-NIR sources 53 at actual color temperatures between 2000° K and 3000° K and for medium-NIR sources 55 at actual color temperatures between 5000° K and 7000° K. Therefore, if the result of the conventional color prediction function for an image from dual-band IR camera sensor 17 were equal to one, the conventional color prediction function would be unable to determine whether the actual color temperature of the light source that lit that image is near 2500° K or is near 6000° K. The conventional color correction circuitry would therefore be unable to perform color correction on images captured by dual-band imagers.

Camera module 12, or electronic device 10, may include image processing circuitry such as image processing and data formatting circuitry 16 that is capable of performing color correction on images captured by dual-band IR camera sensor 17. Imaging processing and data formatting circuitry 16 may analyze captured images in two color spaces. Each of the color spaces may be based on the strength of electrical signals from red pixels, the strength of electrical signals from green pixels (e.g., G signals), the strength of electrical signals from blue pixels (e.g., B signals), the relative strength of electrical signals from red pixels as compared to green pixels (e.g., R/G signals or G/R signals), the relative strength of electrical signals from red pixels as compared to blue pixels (e.g., R/B signals or B/R signals), the relative strength of electrical signals from blue pixels as compared to green pixels (e.g., B/G signals or G/B signals), other functions of the electrical signals from the pixels of dual-band IR camera sensor 17, or combinations of these and other functions of the electrical signals from the pixels of imager 17.

When sensor 17 is operating in a color mode, image processing circuitry 16 may analyze images captured by dual-band camera sensor 17 to determine whether the images were lit by high-NIR light sources, medium-NIR light sources, or low-NIR light sources. When circuitry 16 determines that an image was lit by a high-NIR light source, circuitry 16 may apply a high-NIR color correction matrix (e.g., an incandescent color correction matrix) to the image as a color correction operation (e.g., to remove additional red and blue signals attributable to the relatively high amount of NIR light produced by the high-NIR light source). When circuitry 16 determines that an image was lit by a medium-NIR light source, circuitry 16 may apply a medium-NIR color correction matrix (e.g., a sunlight color correction matrix) to the image as a color correction operation. When circuitry 16 determines that an image was lit by a low-NIR light source, circuitry 16 may apply a low-NIR color correction matrix (e.g., a fluorescent color correction matrix) to the image as a color correction operation. Color correction matrices (CCMs) may sometimes be referred to herein as color correction function.

Figure 8:
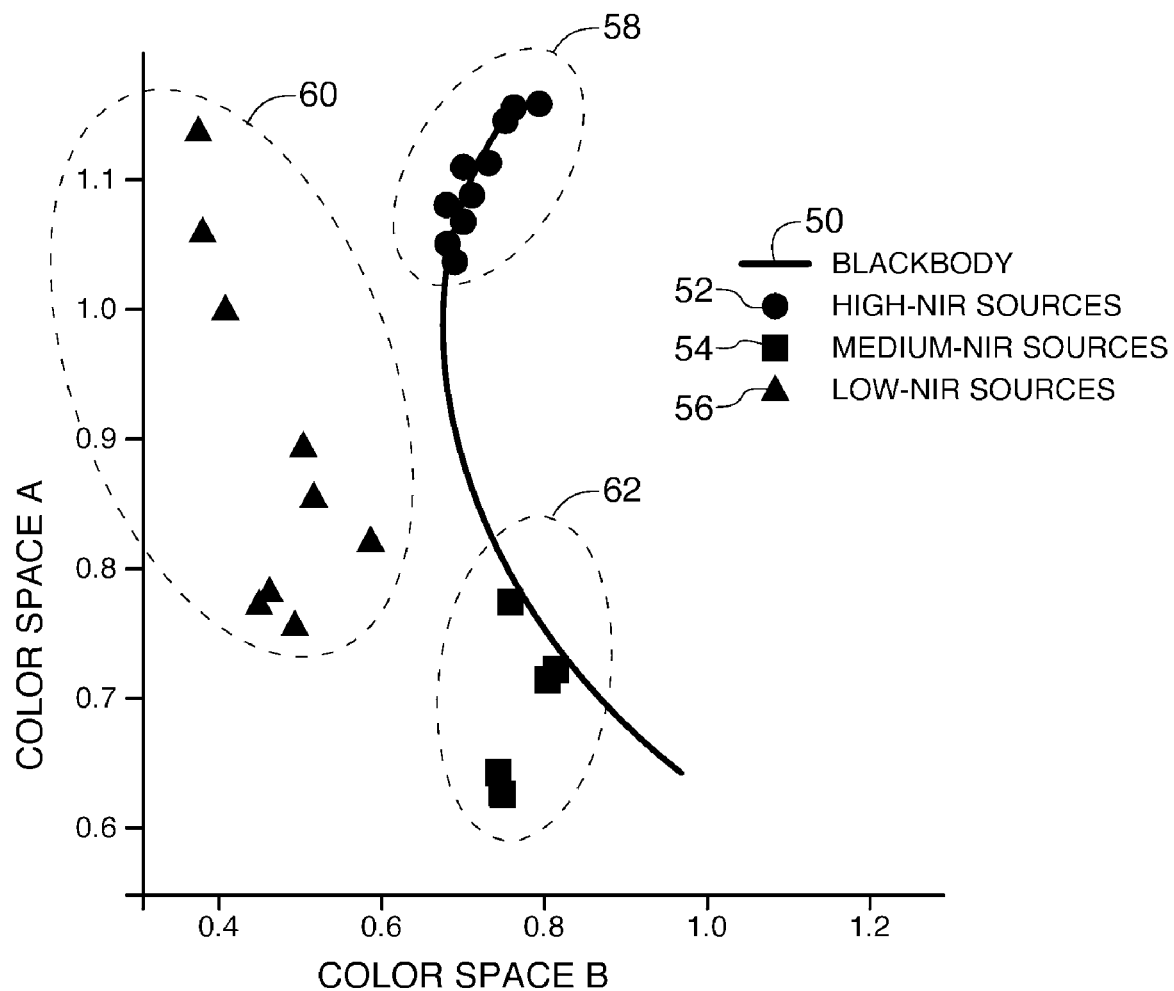
FIG. 8 is a graph of illustrative color spaces for light sources that have varying levels of near-infrared light that may be used by color correction circuitry to detect the light sources based on the images captured with a dual-band imager in accordance with an embodiment of the present invention.

When circuitry 16 processes a particular image, circuitry 16 may generate values for that image in two color spaces. For example, circuitry 16 may select a particular region of the image (e.g., a region that circuitry 16 determines is likely to be white) and may calculate values for two color spaces in that region. As one example, circuitry 16 may calculate the first color space by calculating the relative strength of electrical signals from pixels in the region between a first pair of different colors (e.g., R/G signals for that region) and circuitry 16 may calculate the second color space by calculating the relative strength of electrical signals from pixels in the region between a second pair of different colors (e.g., B/G signals for that region). Examples of results of this type of operation are shown in FIG. 8.

Graph 50 represents the result of applying a conventional color prediction function of the type described in connection with FIG. 4 to images lit by an idealized blackbody radiator as a function of the actual color temperature of the blackbody radiator.

Points 52 represent examples of light sources with a relatively high amount of near-infrared (NIR) light such as incandescent lights and are sometimes referred to herein as high near-infrared or high-NIR light sources. Each point 52 represents the result of applying the conventional color prediction function to an image captured by dual-band sensor 17 and lit by a particular high-NIR light source and each point 52 represents the actual color temperature of that high-NIR light source.

Points 56 represent examples of light sources with a relatively low amount of near-infrared (NIR) light such as fluorescent lights and are sometimes referred to herein as low near-infrared or low-NIR light sources. Each point 56 represents the result of applying the conventional color prediction function to an image captured by dual-band sensor 17 and lit by a particular low-NIR light source and each point 56 represents the actual color temperature of that low-NIR light source.

Points 54 represent examples of light sources with a proportion of near-near-infrared (NIR) between that of low-NIR and high-NIR light sources. Points 54 may represent light sources such as daylight from the sun and which are sometimes referred to herein as medium near-infrared or medium-NIR light sources). Each point 54 represents the result of applying the conventional color prediction function to an image captured by dual-band sensor 17 and lit by a particular medium-NIR light source and each point 54 represents the actual color temperature of that medium-NIR light source.

As shown in FIG. 8, when image processing circuitry 16 analyzes images captured by dual-band camera sensor 17 in two distinct color spaces, circuitry 16 can use the results of the analysis to determine whether the images were lit by high-NIR, medium-NIR, or low-NIR light sources. In particular, when the two color spaces are plotted against each other, results for high-NIR light sources may be grouped together in region 58, results for medium-NIR light sources may be grouped together in region 62, and results for low-NIR light sources may be grouped together in region 60, as examples. By calculating values for color space A and color space B for an image, circuitry 16 can determine what type of light source lit that image and can then perform appropriate color correction (e.g., by processing image data for that image with an appropriate color correction matrix associated with the type of light source that the circuitry identifies as having lit the image). As one example, color space A may be a ratio of red light and green light intensities in an image and color space B may be ratio of blue light and green light intensities in the image.

Figure 9:
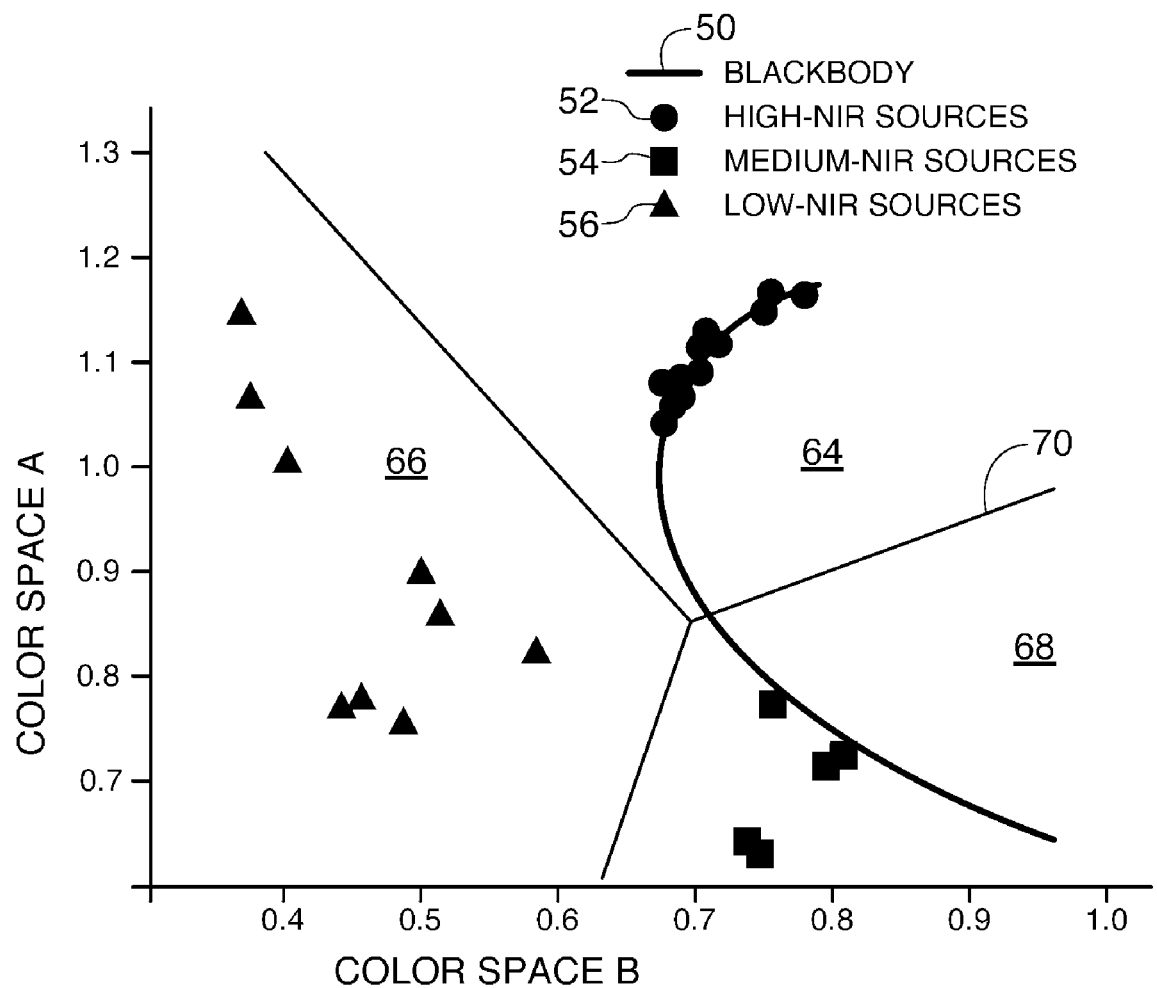
FIG. 9 is a graph of the type shown in FIG. 8 in which lines delineate illustrative boundaries between different types of light sources that produce different levels of near-infrared light and which may be used by color correction circuitry in determine which one of a plurality of color correction matrices to use in performing color correction of images captured with a dual-band imager in accordance with an embodiment of the present invention.

Circuitry 16 may determine whether images were lit by high-NIR, medium-NIR, or low-NIR light sources by sorting the images into various regions using values for color space A and color space B for those images. An example of this type of arrangement is shown in FIG. 9. As shown in FIG. 9, circuitry 16 may analyze an image and determine that the image was lit by a high-NIR light source if the values for color space A and color space B for that image lie within region 64. If the values for color space A and color space B for the image lie within region 66 or region 68, circuitry 16 may determine that the image was lit by a low-NIR light source or a medium-NIR light source, respectively.

When circuitry 16 determines that an image has color properties that lie in region 64, circuitry 16 may apply a high-NIR color correction matrix to the image as a color correction operation. When circuitry 16 determines that an image has color properties that lie in region 66, circuitry 16 may apply a low-NIR color correction matrix to the image as a color correction operation. When circuitry 16 determines that an image has color properties that lie in region 68, circuitry 16 may apply a medium-NIR color correction matrix to the image as a color correction operation.

When capturing video (e.g., when capturing images in a continual manner), circuitry 16 may implement logic to reduce switching between regions for each image. With this type of arrangement, individual frames of video of a scene with color properties can be processed using the same color correction matrix, even if the color properties of those frames occasionally stray into a region associated with another color correction matrix. As one example, circuitry 16 may only switch to another color correction matrix if the color properties (e.g., the values for color space A and color space B) move beyond a threshold amount into a region associated with another color correction matrix.

In FIG. 9, boundary lines 70 illustrate the boundaries between regions 64, 66, and 68. While boundary lines 70 are straight and converge on a triple-point in FIG. 9 this is merely an illustrative example. In general, boundary lines 70 may have any shape.

If desired, circuitry 16 may include more or less granularity in determining what type of light source lit an image. For example, circuitry 16 may use a two color space arrangement of the type described in connection with FIG. 9 that includes 2 regions, 4 regions, 5 regions, or more regions (each region being associated with a light source that emits a different fraction of NIR light).

Figure 10:
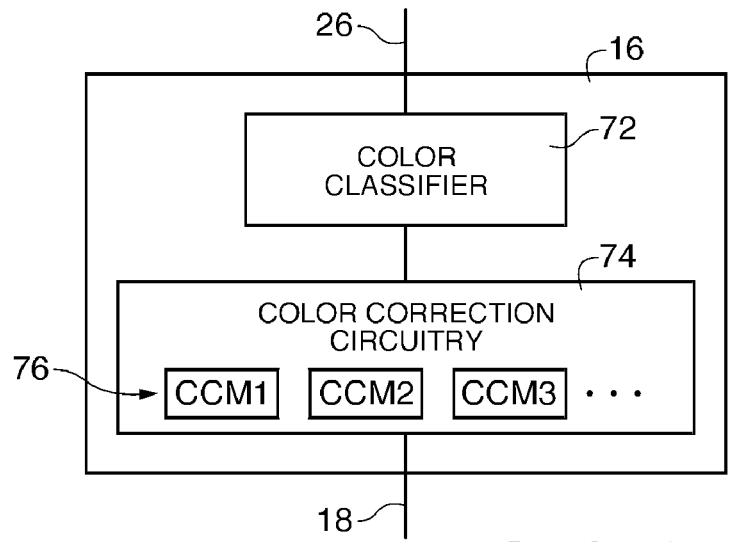
FIG. 10 is a diagram of illustrative image processing and data formatting circuitry of the type shown in FIG. 1 that may include a color classifier and color correction circuitry that uses one of a plurality of color correction matrices to perform color correction of images captured with a dual-band imager in accordance with an embodiment of the present invention.

Image processing and data formatting circuitry 16 that may be used in processing images from dual-band camera sensor 17 is shown in FIG. 10. As shown in FIG. 10, color classifier 72 may receive video and still image data from dual-band camera sensor 17 of FIG. 1 via path 26. Color classifier 72 may calculate values for each image in color space A and color space B and determine what type of light source lit the image (e.g., classifier 72 may determine whether a high-NIR, a medium-NIR, or a low-NIR light source lit the image).

Color correction circuitry 74 may perform operations such as color processing operations on the video and still image data from dual-band camera sensor 17 using information from color classifier 72. For example, color correction circuitry may adjust color balances in the video and still image data using one of a plurality of color correction matrices 76. As one example, each color correction matrix 76 may be associated with a respective type of light source. With this type of arrangement, color correction circuitry may use information from color classifier 72 identifying whether an image was lit with a high-NIR light source, a medium-NIR light source, or a low-NIR light source to determine when to adjust color balances in the image by applying a high-NIR color correction matrix, a medium-NIR color correction matrix, or a low-NIR color correction matrix, respectively, to the video and still image data. The color correction matrices may provide a sufficient amount of color correction to compensate for the differences in near-infrared light content caused by different types of light sources (which affects dual-band camera sensor 17 due to the additional near-infrared response to sensor 17 in band 30 of FIG. 5). Color correction circuitry 74 may output image data on path 18 that has been color corrected using a color correction matrix 76 selected by color classifier 72.

Color correction circuitry 74 may use color correction matrices 76 to selectively weight image signals from red pixels, green pixels, and blue pixels in sensor 17. As one example, which may apply when pixels in sensor 17 have relative responses such as those shown in the graph of FIG. 6, a high-NIR color correction matrix (e.g., CCM1) may reduce the weight of image signals from red pixels relative to the weight of image signals from blue and green pixels to compensate for the additional near-infrared response of red pixels (shown as region 40 in FIG. 6) and may reduce the weight of image signals from blue pixels relative to the weight of image signals from green pixels to compensate for the additional near-infrared response of blue pixels (shown as region 42 in FIG. 6). A low-NIR color correction matrix may increase the weight of image signals from red pixels relative to the weight of image signals from blue and green pixels and may increase the weight of image signals from blue pixels relative to the weight of image signals from green pixels. A medium-NIR color correction matrix may weight image signals from red pixels, green pixels, and blue pixels as appropriate.

Figure 11:
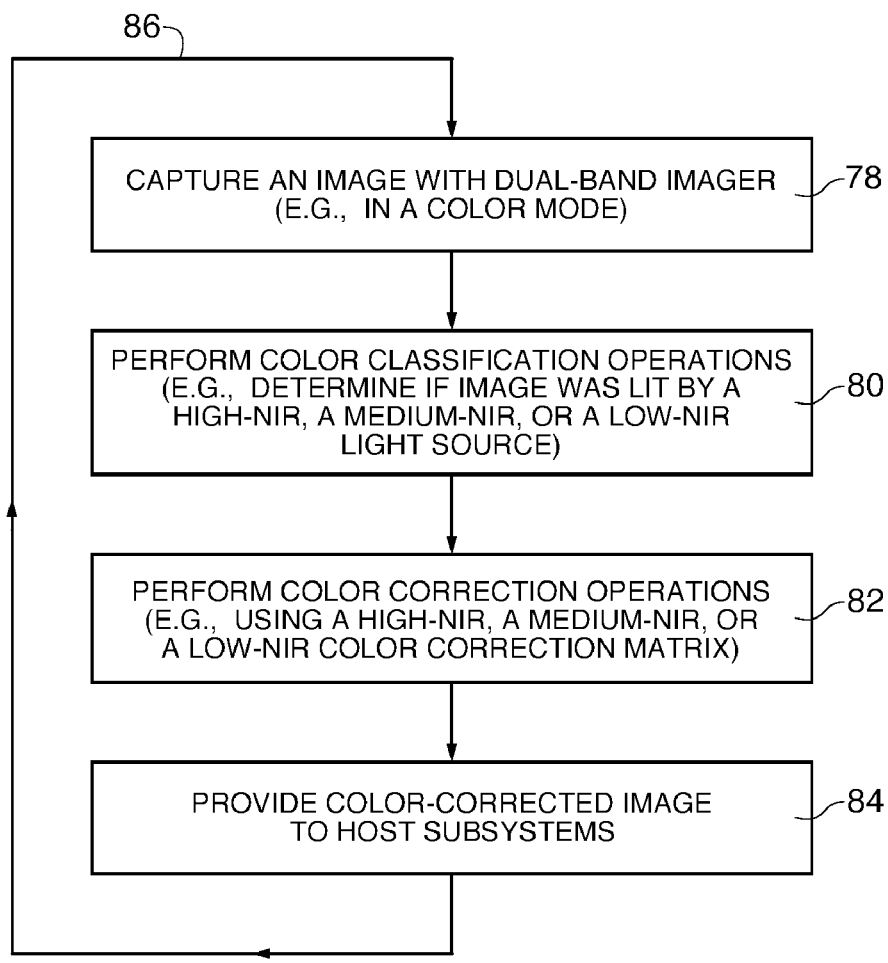
FIG. 11 is a flow chart of illustrative steps involved in using color correction circuitry in the color correction of images captured with a dual-band imager in accordance with an embodiment of the present invention.

A flow chart of steps involved in using image processing and data formatting circuitry 16 of FIG. 1 to perform color correction on images captured by dual-band camera sensor 17 is shown in FIG. 11.

In step 78, dual-band camera sensor 17 may capture an image and provide the captured image to image processing and data formatting circuitry 16. Sensor 17 may capture the image in a color imaging mode and may provide the captured image to circuitry 16 as a raw camera image file (as an example).

In step 80, color classifier 72 in circuitry 16 may perform color classification operations to determine what proportion of light from a light source that lit the image is near-infrared light. Color classifier 72 may analyze the image to generate values in color space A and color space B (FIG. 9) and then determine which region the values lie in and what type of light source lit the image. As an example, color classifier 72 may analyze the image to determine if the image was lit by a high-NIR light source such as incandescent lights, a medium-NIR light source such as sunlight, or a low-NIR light source such as fluorescent lights.

In step 82, color correction circuitry 74 may perform color correction operations on the image. As an example, color correction circuitry 74 may use a color correction matrix associated with the type of light source identified by color classifier 72 in step 80 as having lit the image to adjust color levels (i.e., adjust white balance) in the image.

In step 84, image processing and data formatting circuitry 16 may provide the color corrected image produced by color correction circuitry 74 to host subsystems 20 over path 18.

As shown by loop 86, the operations of steps 78, 80, 82, and 84 may be repeated when camera module 12 is capturing video or when camera module 12 is capturing a series of still images.

Various embodiments have been described illustrating color correction circuitry and methods for dual-band imaging systems.

An electronic device may have a dual-band image sensor array that is sensitive to incident light in a first band that includes visible wavelengths and in a second band that includes near-infrared wavelength.

The electronic device may include image processing circuitry that adjusts color balances on images captured by the dual-band image sensor array. The image processing circuitry may analyze each captured image in two different color spaces to determine what type of light source lit each image. In particular, the image processing circuitry may determine whether an image was lit by a light source having a relatively high proportion of near-infrared emissions such as an incandescent light, a light source having a relatively low proportion of near-infrared emissions such as a fluorescent light, or a light source having an intermediate proportion of near-infrared emissions such as sunlight or other blackbody radiator. After determining what type of light source lit an image, the image processing circuitry may adjust color balances in that image using a color correction matrix associated with that type of light source.

The foregoing is merely illustrative of the principles of this invention which can be practiced in other embodiments.

What is claimed is:

1. A method of capturing an image comprising:

with a plurality of light-sensitive pixels and a plurality of IR filters in an imager, simultaneously generating image signals from light in a first wavelength band that is associated with near-infrared light and a second wavelength band from light that is associated with visible light; and with color correction circuitry, generating a color corrected image from the image signals, wherein generating the image signals from light in the first wavelength band that is associated with near-infrared light and from light that is associated with visible light with the plurality of light-sensitive pixels in the imager comprises:

with a first plurality of light-sensitive pixels in the image sensor, generating first image signals from light in the first wavelength band and from light in a second wavelength band that is associated with visible light;

with a second plurality of light-sensitive pixels in the image sensor, generating second image signals from light in the first wavelength band and from light in a third wavelength band that is associated with visible light; and with a third plurality of light-sensitive pixels in the image sensor, generating third image signals from light in the first wavelength band and from light in a fourth wavelength band that is associated with visible light, wherein generating the color corrected image from the image signals with the color correction circuitry comprises:

comparing the first image signals to the second image signals;

comparing the third image signals to either the first image signals or the second image signals; and selecting one of a plurality of color correction matrices based on the comparison between the first image signals and the second image signals and based on the comparison between the third image signals and either the first image signals or the second image signals, wherein each of the color correction matrices defines a unique set of first, second, and third weighting factors.

2. The method defined in claim 1 wherein generating the color corrected image from the image signals with the color correction circuitry comprises determining that the image was lit by an incandescent lamp based on the comparison between the first image signals and the second image signals and based on the comparison between the third image signals and either the first image signals or the second image signals and wherein the selected color correction matrix is an incandescent color correction matrix.

3. The method defined in claim 1 wherein generating the color corrected image from the image signals with the color correction circuitry comprises determining that the image was lit by an fluorescent lamp based on the comparison between the first image signals and the second image signals and based on the comparison between the third image signals and either the first image signals or the second image signals and wherein the selected color correction matrix is a fluorescent color correction matrix.

4. The method defined in claim 2 wherein generating the color corrected image from the image signals with the color correction circuitry comprises determining that image was lit by one of a plurality of pre-defined light sources based on a set of comparisons between image signals.

\* \* \* \* \*